US007251409B2

(12) United States Patent
Shakeri

(10) Patent No.: US 7,251,409 B2
(45) Date of Patent: Jul. 31, 2007

(54) CABLE STRAIN RELIEF DESIGN FOR LIMITED SPACE THROUGH-HOLE APPLICATIONS

(75) Inventor: Mohammad Shakeri, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/273,032

(22) Filed: Nov. 14, 2005

(65) Prior Publication Data

US 2007/0110385 A1 May 17, 2007

(51) Int. Cl.
*G02B 6/00* (2006.01)
*H02G 3/18* (2006.01)

(52) U.S. Cl. ...................... 385/138; 385/134; 174/652; 174/653; 174/655; 174/659; 174/660; 174/665; 174/667; 174/668

(58) Field of Classification Search ................ 385/138; 174/660, 665
See application file for complete search history.

(56) References Cited

U.S. PATENT DOCUMENTS

| | | | | |
|---|---|---|---|---|
| 3,913,956 A * | 10/1975 | Eidelberg et al. | ........... | 285/343 |
| 6,297,456 B1 * | 10/2001 | Nakatani | .................... | 174/135 |
| 6,573,450 B2 * | 6/2003 | Saito et al. | ................. | 174/665 |

* cited by examiner

*Primary Examiner*—Frank G. Font
*Assistant Examiner*—Ryan Lepisto
(74) *Attorney, Agent, or Firm*—Woodcock Washburn LLP

(57) ABSTRACT

A cable strain relief that includes an over-molded portion affixed to a cable and a flexible decorative boot. The decorative boot is passed through an opening in an enclosure. The cable is passed through a cylindrical space form in the decorative boot until the over-molded piece engages the walls of the cylindrical space, holding it in place. The over-molded portion is positioned within the decorative boot such that a flange is seated on a collar of the decorative boot within the enclosure.

13 Claims, 3 Drawing Sheets

CABLE STRAIN RELIEF DESIGN FOR LIMITED SPACE THROUGH-HOLE APPLICATIONS

TECHNICAL FIELD

The present invention generally relates to electrical cables. More particularly, the present invention is directed to electrical cable strain reliefs and methods of manufacture thereof.

BACKGROUND

Strain reliefs are generally used in electrical components which have cords that extend through an opening in the case or housing of a component. If left unprotected, the cord would soon fray due to the friction of rubbing against the case opening. Strain relief is also provided to relieve bending strains in the cord as it bends at or near its connection with the opening.

Typical applications include using a knot on the cable to prevent it from pulling through and opening, hold downs inside an enclosure, or an over-mold that is captured between two sections of an enclosure. However, typical applications do not apply where the enclosure is very small or if the opening in the enclosure is not at intersection of the sections of the enclosure.

SUMMARY

A strain relief having an over-molded portion on a cable and a decorative boot that is inserted into an opening of an enclosure. The decorative boot is passed through an opening in an enclosure. The cable is passed through a cylindrical space form in the decorative boot until the over-molded piece engages the walls of the cylindrical space, holding it in place. The over-molded portion is positioned within the decorative boot such that a flange is seated on a collar of the decorative boot within the enclosure.

Additional features and advantages will be made apparent from the following detailed description that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

Figure 1:
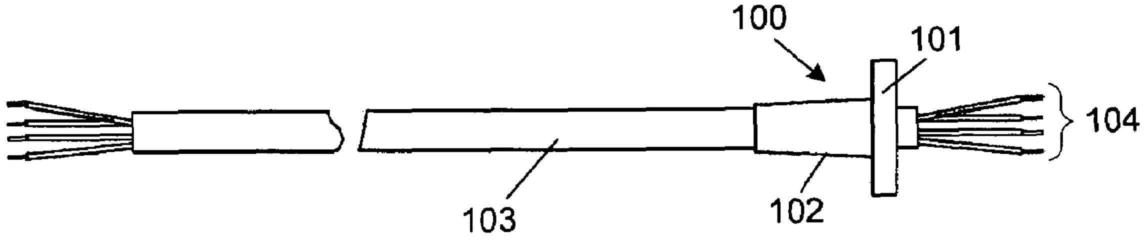
FIG. 1 is a side view of a cable having an over-mold.
Figure 2:
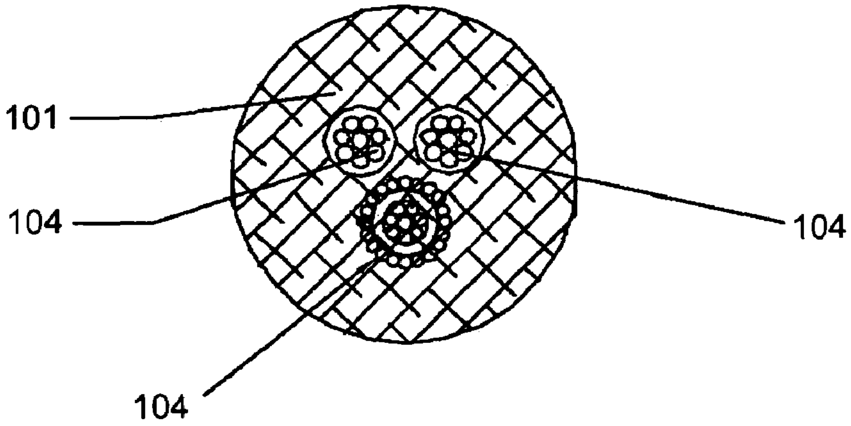
FIG. 2 is a top view of the over-mold.
Figure 3:
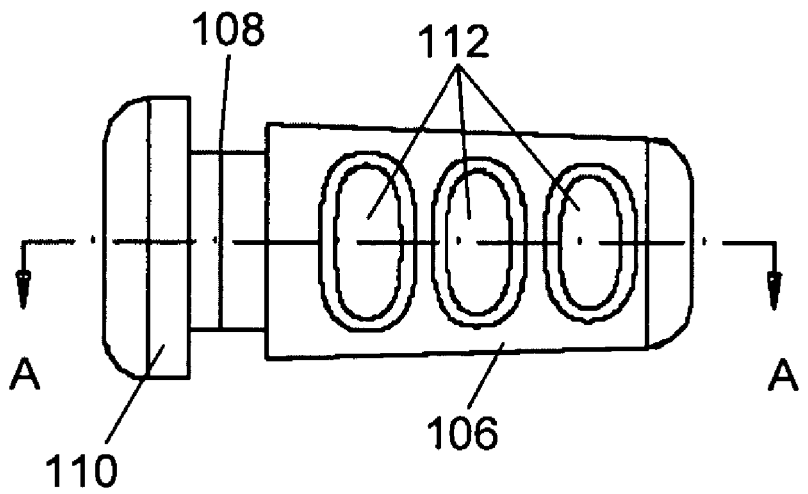
FIG. 3 is a side view of a decorative boot.
Figure 4:
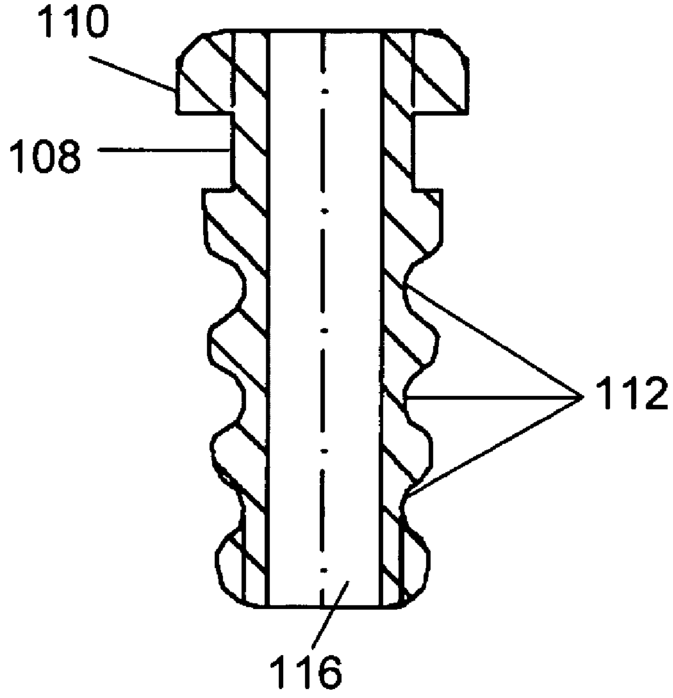
FIG. 4 is a sectional view taken along section A-A in FIG. 4.

With reference to FIGS. 1-5, there is illustrate a strain relief having an over-mold 100 with a flange 101 and a tapered portion 102 formed at the end of a cable 103. The cable 103 may have one or more conductors 104. As shown with particularity in FIG. 2, the flange 101 is preferably generally circular where the conductors 104 are disposed evenly around a center point.

The over-mold 100 is preferably composed of TPE rubber (thermoplastic elastomer). The tapered portion 102 is molded such that it is wider near the flange 101, for purposes that will be described below. The over-mold 100 is made by placing the cable inside the bottom half of a hard steel tool, placing or closing the top half of the tool and molding to the cable 103.

The strain relief includes a flexible decorative boot having a body 106 with ribs 112, a recessed portion 108, and a collar 110. The boot is composed of TPE rubber (thermoplastic elastomer) and made by standard molding process using a hard steel tool that is designed to create the 106 shape. A cylindrical space 116 is formed within the decorative boot as part of the process. The ribs 112 provide additional flexibility to the body 106.

Figure 5:
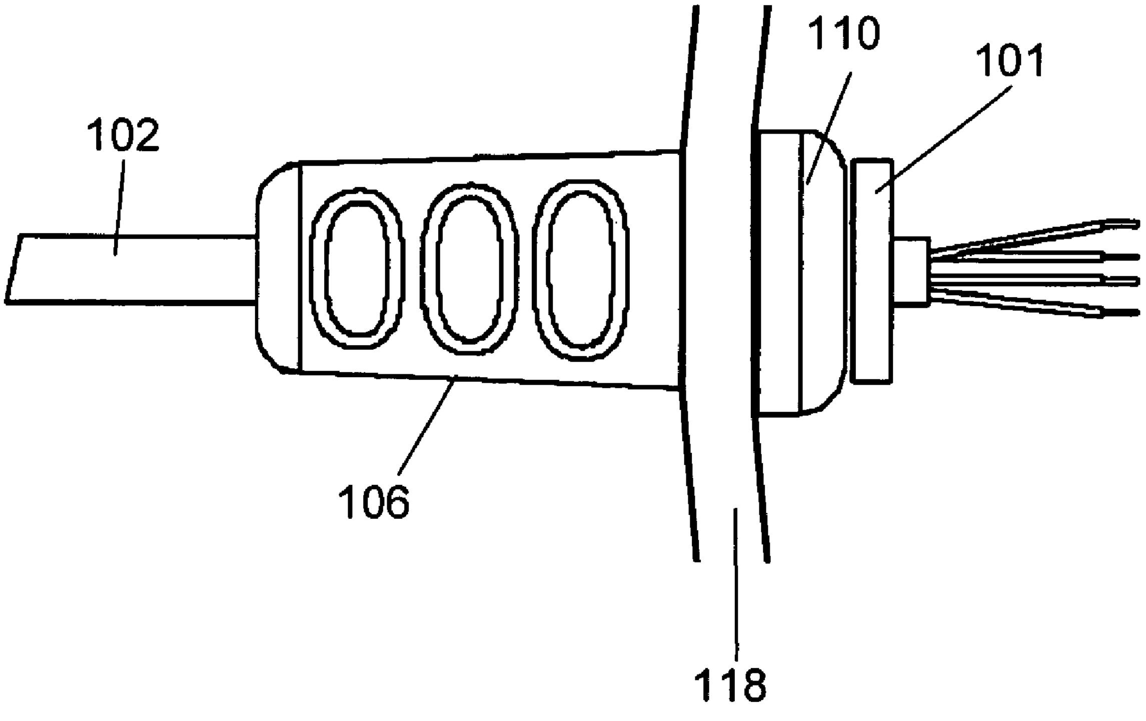
FIG. 5 is a side view of the decorative boot/over-mold inserted into an enclosure.

FIG. 5 illustrates the strain relief, as inserted into an enclosure 118. To construct the strain relief, the decorative boot body 106 is passed through an opening in the enclosure until the recessed portion 108 engages the edge opening. The collar 110 remains inside the enclosure 118. Next, the cable 103 is passed through the space 116 in the body 106.

As the cable 103 is pulled through, the tapered portion 102 frictionally engages the walls of the cylindrical space 116, holding the over-mold 100 in place. This also serves to expand the decorative boot within the opening, further securing the strain relief. The over-mold 100 is positioned within the decorative boot 106 such that the flange 101 is seated on the collar 110.

The design of the strain relief allows it to be sized and placed into any opening in an enclosure. Thus, there is no need for the opening to be positioned at the joint between sections of the enclosure with this design. The design also reduces the amount of space required inside the enclosure for the strain relief.

While the present invention has been described in connection with the preferred embodiments of the various FIGS., it is to be understood that other similar embodiments may be used or modifications and additions may be made to the described embodiment for performing the same function of the present invention without deviating therefrom.

What is claimed:

1. A two part cable strain relief comprising an assembly of:

an over-molded portion that is affixed to a cable, the over-molded portion comprising a tapered portion having a small diameter first end and a larger diameter second end, and a flange disposed on the second end, the flange having a diameter greater than the second end of the tapered portion; and a boot having a collar portion, a recessed portion, and a body portion, each boot portion having a generally cylindrical space defined therein;

wherein said over-molded portion is engaged within a wall defined by said cylindrical space, and wherein the flange of the over-molder portion abuts the collar portion of the boot when the over-molded portion is inserted into the boot.

2. The cable strain relief of claim 1, wherein said recessed portion is disposed within an opening of an enclosure.

3. The cable strain relief of claim 1, wherein said boot includes ribs.

4. The cable strain relief of claim 1, wherein said tapered portion is disposed within said generally cylindrical space to frictionally engage said wall.

5. The cable strain relief of claim 1, wherein said over-molded portion comprises a thermoplastic elastomer.

6. The cable strain relief of claim 5, wherein said over-molded portion is formed by:

placing said cable and said thermoplastic elastomer inside a bottom portion of a tool;

closing a top portion of the tool onto said cable; and molding said thermoplastic elastomer to the cable.

7. The cable strain relief of claim 1, wherein said boot comprises a thermoplastic elastomer.

8. The cable strain relief of claim 7, wherein said boot is formed by a molding process.

9. A cable strain relief, comprising:

a cable having an over-molded portion affixed thereto, the over-molded portion having a flange;

a flexible boot having a collar portion, a recessed portion, a body portion in linear alignment and an internal cylindrical space therethrough, wherein the body portion has external ribs; and wherein said over-molded portion is received by the space defined within said boot and wherein the flange of the over-molded portion abuts the collar portion of the boot when assembled.

10. The cable strain relief of claim 9, wherein said over-molded portion includes a tapered portion that frictionally engages a wall of said space.

11. A cable strain relief for an enclosure, comprising:

a flexible boot that is inserted in an opening defined by said enclosure, the boot comprising a collar portion, a recessed portion, and a body portion in linear alignment and an internal cylindrical space therethrough;

a cable having an over-molded portion that is received by said flexible boot, the over-molded portion comprising a flange, wherein inserting said over-molded portion into said flexible boot causes said flexible boot to expand, securing said over-molded portion in said boot, and wherein inserting causes the flange to abut the collar portion.

12. The cable strain relief of claim 11, wherein said boot includes ribs.

13. The cable strain relief of claim 11, wherein said over-molded portion includes a tapered portion.

* * * * *